US009628805B2

(12) United States Patent
Smarda et al.

(10) Patent No.: US 9,628,805 B2
(45) Date of Patent: Apr. 18, 2017

(54) TUNABLE MULTI-PART PERCEPTUAL IMAGE HASHING

(71) Applicant: Avast Software s.r.o., Prague (CZ)

(72) Inventors: Martin Smarda, Karlovy Vary (CZ); Pavel Sramek, Pribram (CZ)

(73) Assignee: AVAST SOFTWARE S.R.O., Prague (CZ)

(*) Notice: Subject to any disclaimer, the term of this patent is extended or adjusted under 35 U.S.C. 154(b) by 24 days.

(21) Appl. No.: 14/716,685

(22) Filed: May 19, 2015

(65) Prior Publication Data

US 2015/0339829 A1 Nov. 26, 2015

Related U.S. Application Data

(60) Provisional application No. 62/000,918, filed on May 20, 2014.

(51) Int. Cl.
G06K 9/00 (2006.01)
H04N 19/126 (2014.01)
G06F 3/0481 (2013.01)
H04N 19/625 (2014.01)
G06F 21/56 (2013.01)
H04N 1/32 (2006.01)
G06F 17/30 (2006.01)

(52) U.S. Cl.
CPC ......... H04N 19/126 (2014.11); G06F 3/0481 (2013.01); G06F 3/04817 (2013.01); G06F 17/30247 (2013.01); G06F 21/564 (2013.01); G06F 21/565 (2013.01); H04N 1/32283 (2013.01); H04N 19/625 (2014.11)

(58) Field of Classification Search
CPC ... G06T 7/0095; G06T 7/0097; G06T 7/0081; G06T 2207/20052; G06T 2207/20132; G06T 2207/20221; G06T 2207/30168; G06T 2210/32; G06F 3/04817; H04N 19/625; H04N 19/126
See application file for complete search history.

(56) References Cited

U.S. PATENT DOCUMENTS

| 5,907,619 A * | 5/1999 | Davis ............... G06F 21/606 348/E7.056 |
| 6,834,344 B1 * | 12/2004 | Aggarwal ......... G06T 1/0042 382/100 |
| 2001/0002827 A1 * | 6/2001 | Yamazaki ......... H04N 1/00867 345/82 |
| 2002/0178410 A1 * | 11/2002 | Haitsma ........... G06F 17/30787 714/709 |
| 2005/0149727 A1 * | 7/2005 | Kozat ............... G06F 3/0317 713/165 |
| 2005/0278733 A1 * | 12/2005 | Neogi ............... H04N 7/162 725/31 |

(Continued)

OTHER PUBLICATIONS

Smith, Lindsay I. "A tutorial on principal components analysis." Cornell University, USA 51.52 (2002): 65.*

Primary Examiner — Li Liu
(74) Attorney, Agent, or Firm — Husch Blackwell LLP

(57) ABSTRACT

Systems and methods generate a perceptual image hash of an image. The perceptual image hash can be generated from multiple features extracted from a DCT transformation of the image. The perceptual image hash can be compared to other perceptual image hash values using a weighted Hamming distance function.

30 Claims, 5 Drawing Sheets

(56) References Cited

U.S. PATENT DOCUMENTS

| | | | |
|---|---|---|---|
| 2006/0013488 A1* | 1/2006 | Inoue | G06T 1/005 |
| | | | 382/232 |
| 2007/0271226 A1* | 11/2007 | Zhang | G06F 17/30265 |
| 2008/0263042 A1* | 10/2008 | Li | G06F 17/3025 |
| 2010/0070509 A1* | 3/2010 | Li | G06F 17/3002 |
| | | | 707/747 |
| 2010/0310132 A1* | 12/2010 | Perez Gonzalez | G06K 9/4642 |
| | | | 382/112 |
| 2011/0032984 A1* | 2/2011 | Dorman | H04N 19/176 |
| | | | 375/240.2 |

* cited by examiner

ABSOLUTE VALUE ENCODING

AVG NEIGHBORHOOD DIFFERENCE

TUNABLE MULTI-PART PERCEPTUAL IMAGE HASHING

CROSS-REFERENCE TO RELATED APPLICATION

This application claims the benefit of U.S. Provisional Patent Application No. 62/000,918 filed May 20, 2014, the entire disclosure of which is hereby incorporated by reference.

FIELD

This disclosure relates generally to systems and methods for image processing, and more particularly, to multi-part perceptual image hashing that is tunable for particular image domains.

BACKGROUND

Numerous families of malware exist whose binaries change rapidly as new versions of malware are introduced. In many cases, the malware uses the same icon as a legitimate software package. A familiar icon can be crucial to the success of social engineering malware that the authors were attempting to perform with this malware. However, signature-based detection rate can be highly inconsistent and the newest samples may barely be detected at the time of examination.

BRIEF DESCRIPTION OF THE DRAWINGS

For a better understanding of the inventive subject matter, reference may be made to the accompanying drawings in which.

DETAILED DESCRIPTION

Figure 1:
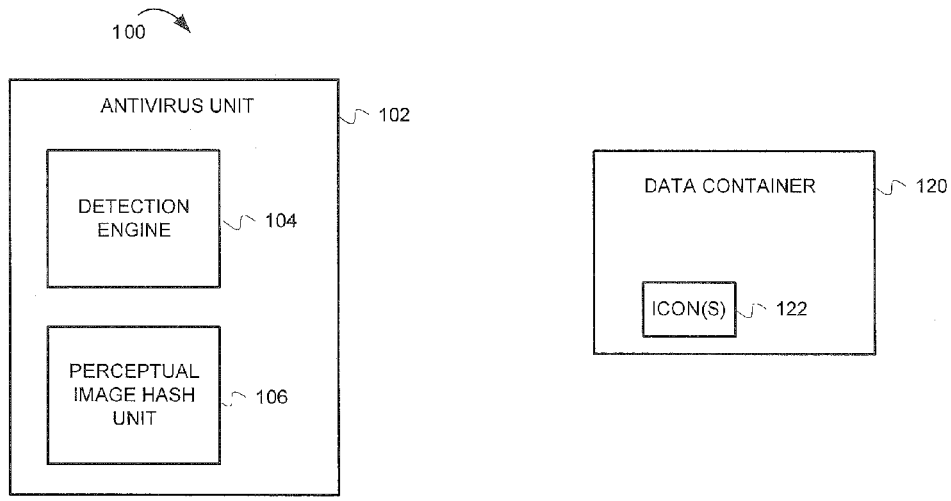
FIG. 1 is a block diagram of an operating environment according to embodiments of the invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Described herein are systems and methods for creating perceptual image hashes that can be tuned for images in a particular domain. While the example features of the disclosure are discussed in the context of icon images, the systems and methods of the disclosure can be adapted to other image domains.

The concept of an application icon is common for many of today's consumer-oriented computing platforms, desktop and mobile alike. Icons are being abused by malware authors attempting to take advantage of the simplest infection vector possible: impersonating something else and convincing the user to execute a malicious program himself. When compared to a legitimate icon for an application, the fraudulent icons may be resized or they may have a few pixels changed on purpose. Additionally, there usually are multiple historical versions of any given icon, which makes icons problematic as a heuristic indicator.

Disclosed herein are systems and methods that aid in overcoming this problem by using overall visual similarity to identify potential malware. Applying an algorithm based on frequency transformation to the icons, the disclosed embodiments can be used to place those with common traits close together. The disclosed systems and methods can be performed at a large scale with popular icons and a stream of fresh samples and allowing separation of suspicious ones from the rest. The process can be applied to Windows malware which usually mimics documents as well as the rising Android threats and their tendency to repackage popular applications with malicious code added.

FIG. 1 is a block diagram of an operating environment 100 according to embodiments of the invention. In some embodiments, operating environment 100 includes an antivirus unit 102 and a data container 120.

Data container 120 can be a file or set of files that include software. Data container 120 can be an executable file, an installation package, a document or other file that may potentially contain a virus, potentially unwanted program, or other malware. Data container 120 can include one or more icon images 122. Icons 122 can be of various formats. For example, in Android environments, icons are relatively large (e.g., at least 96×96 pixels), mostly in Portable Network Graphics (PNG) format, and rarely in Joint Photographic Experts Group (JPEG) format. In Windows Portable Executable environments (the Windows format analogous to the Android Application Package (APK)), icons are relatively small (e.g., usually 32×32 pixels) in ICO format, with PNG sometimes used. While Android is a popular smart phone environment for use in some embodiments, the inventive subject matter is not limited to any particular icon format, image data format, or operating environment.

Antivirus unit 102 can be any type of antivirus software. Although illustrated as a single unit in FIG. 1, functionality provided by antivirus unit 102 can be distributed across multiple computers. Antivirus unit 102 may operate on a personal computer, server computer, laptop computer, tablet computer, smart phone, or any other electronic computing device. Antivirus unit 102 may include a detection unit 104 and a perceptual image hash unit 106. Detection unit 104 may analyze software to determine if a virus or other malware is present in a data container 120 or other software. Perceptual image hash unit 106 can be used to generate a perceptual image hash of the image data for icons 122. The perceptual image hash may be generated as described below with reference to FIG. 2. The resulting image hash may be provided as input into detection unit 104 to aid in determining if a virus is present in data container 120. For example, a similar icon is often the only connection between families of malware as well as the only connection between new versions of the same malware strain, whose binaries are efficiently obfuscated to prevent standard malware detection methods from seeing the relationships among them. The fact that an icon in a data container 120 may be similar to icons used in known malware may aid the detection unit in determining steps required to make a final determination that the data container includes malware.

Figure 2:
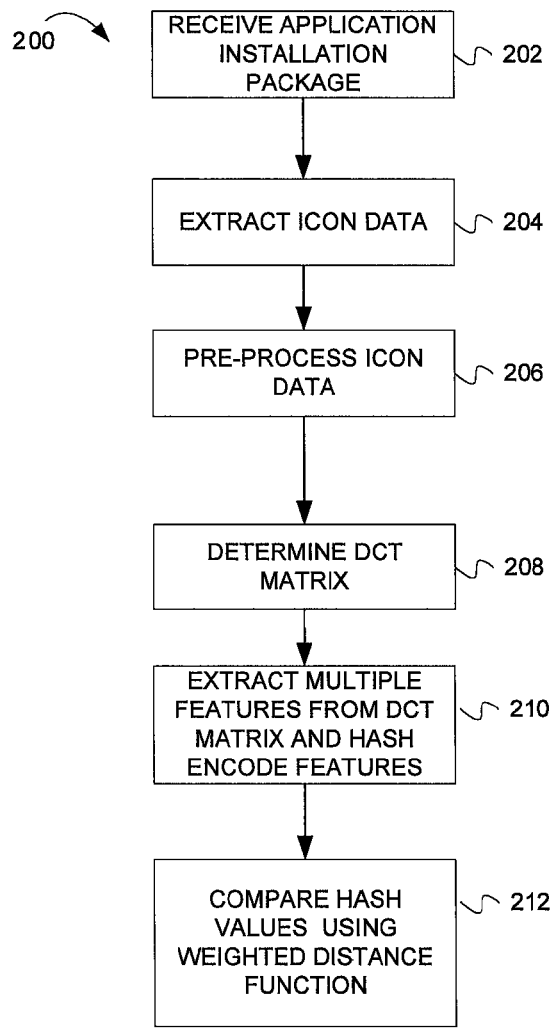
FIG. 2 is a flowchart describing a method for creating a perceptual image hash.

FIG. 2 is a flowchart 200 describing example operations for creating a perceptual hash according to embodiments. The method may, in some embodiments, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 2 is inclusive of acts that may be taken by an operating environment 100 executing an example embodiment of the invention.

The operations begin at block 202 with receiving an installation package containing icons. The installation package may be any type of installation package for use in installing software on a computing device such as a personal computer, server computer, laptop computer, tablet computer, smart phone, or any other device capable of receiving software for installation.

At block 204, icon image data is extracted and decoded from the installation package. The extraction will be container-specific (e.g., APK, PE) and format-specific (ICO, PNG, JPEG) methods which extract the icon from a sample and convert it into an internal raw bitmap format.

At block 206, the icon image data is pre-processed. In some embodiments, the pre-processing may include converting the icon image to a grayscale image. A blurring function may be applied to the icon image data. For example, the image may be blurred using a kernel convolution. The magnitude applied to the blur can be specific to the image domain. Further, the image can be resized. In some embodiments, the icon image can be cropped and resized to a 32×32 pixel image. However, the icon image can be resized to other values, for example, the image can be resized to an N×N image where N is greater than or equal to 4. Other optional pre-processing operations can include trimming any solid-color border, if present in the image and normalizing luminosity levels in the image. For example, the luminosity values of pixels in the icon image can be normalized by linearly stretching luminosity values of pixels in the image to a black point of 0 (zero) and a white point of 255.

In addition, pre-processing operations may include composing the image with a faint, constant image pattern. In some embodiments, the pattern comprises a two-dimensional pink noise image. This can have the desirable effect of better handling edge case images such as icons that have image data such that a Discrete Cosine Transform of the image would have only horizontal or vertical frequency components. Such cases include icons composed of flags or text alignment icons. While a constant pink noise image pattern can be used for icons; other image patterns can be used for different image domains.

At block 208, a two dimensional Discrete Cosine Transformation (DCT) is applied to the pre-processed image data. Two dimensional DCT is equivalent to a superposition of one dimensional DCTs, applied separately in two dimensions (rows, columns), and, in some embodiments, may be calculated this way.

At block 210, multiple features are taken from the DCT coefficient matrix created at block 208 and used to encode a hash value for the icon image. In some embodiments, an 8×8 sub-matrix of coefficients is created. The extraction typically extracts the top left corner of the DCT matrix. In some embodiments, the extraction starts at the second row and second column from the top-left corner of the DCT matrix. The remainder of the matrix can be disregarded.

Next, multiple features are taken for the coefficients in the sub-matrix. In some embodiments, a sign feature, a magnitude feature, a neighbor variance feature and a differential feature are taken based on the coefficients in the sub-matrix and used to create an image hash value. The feature indicators can be encoded into a bit string in a defined order with respect to their position within the sub-matrix. Encoding multiple features into the hash value can allow retention of more information about the nature of the DCT matrix, and this information can be directly relevant for image similarity comparison. Each of the features has a different effect on the resulting distance of two hashes. Some features tend to be tolerant to different kinds of changes inside the image (they change very slowly when the base image is changed) and some change more rapidly, enabling measurement of minor differences and reduction of false positive matches. In some embodiments, each of the features is encoded at one bit per coefficient, which for four features and the 8×8 sub-matrix size used in some embodiments leads to a hash length of 256 bits. Those of skill in the art having the benefit of the disclosure will appreciate that other numbers of bits per coefficient or other sub-matrix sizes can be used and are within the scope of the inventive subject matter.

Encoding Sign of the Coefficient

In some embodiments, a 1 (one) is encoded if the coefficient is positive or zero, and a 0 (zero) is encoded if the coefficient is negative.

Encoding Magnitude of the Coefficient Absolute Value

Figure 3:
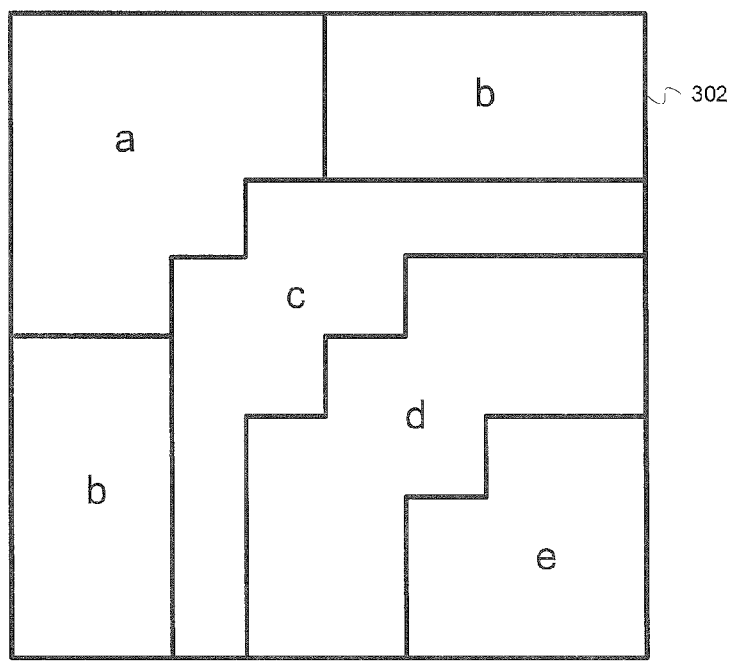
FIG. 3 illustrates separate encoding of areas of a DCT matrix.
Figure 3:
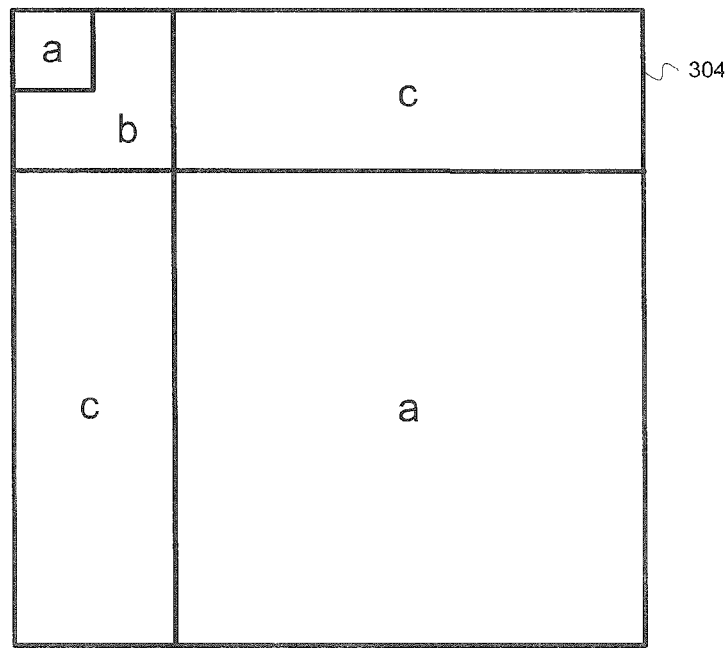

To encode the magnitude of the coefficient absolute value, the DCT sub-matrix can be split into ordered areas. Graph 302 (FIG. 3) illustrates a split used in some embodiments. Graph 302 represents a splitting of the 8×8 DCT sub-matrix into five areas, ordered a-e, for use in encoding the magnitude in some embodiments. For each area a temporary united area is formed with its two neighbors in order, where the first and last areas have only one neighbor. For example, area a is temporarily united with area b, area b is temporarily united with areas a and c, area c is temporarily united with areas b and d etc. The median value of the DCT coefficients in the temporary united area is then computed. Then for each coefficient in the original area, a 1 (one) is encoded if the coefficient is higher than the median value of temporary united area and a 0 (zero) is encoded if the coefficient is not higher than the median value.

Encoding Neighbor Variance

Neighbor variance is a term used to describe a measurement of how much the magnitudes of neighbors vary for a position in the DCT matrix. Neighbor variance can provide insight into the local contrast in frequency domain—how pronounced are the lines of a given thickness. In some embodiment, the pre-encoding values for each coefficient are calculated according to the formula:

$$x_{ij} = \frac{\Sigma_{k \in neighborhood_{ij}} ||DCT_k| - avgNeighborhood_{ij}|}{neighborCount_{ij} \cdot avgNeighborhood_{ij}}$$

$$value_{ij} = \begin{cases} x_{ij} & \text{if } avgNeighborhood_{ij} < 1 \\ 0 & \text{if } avgNeighborhood_{ij} \geq 1 \end{cases}$$

Where $avgNeighborhood_{ij}$ is the arithmetic mean of the absolute values of the 3 to 8 coefficients of the DCT matrix surrounding the position [i,j] $neighborhood_{ij}$ is the set of coordinate pairs and $neighborCount_{ij}$ is the count of the neighbors for that position. When encoding this value, the feature sub-matrix can be divided into areas. Graph 304 (FIG. 3) illustrates areas a-c used in some embodiments:

A large sample of icon images can be analyzed and the median values of average neighbor variances for each matrix area can be determined. When processing an image, the average neighbor variances for each area can be calculated as a byproduct of calculating the neighbor variances themselves. The arithmetic mean of the average neighbor variance and long-term median for each area is taken and is used as a threshold. Neighbor variances in all areas a-c are encoded as 1 (one) if they are above the threshold or as 0 (zero) if they are not.

Encoding Differential

In some embodiments, a large sample of icon images can be analyzed and have their DCT matrix calculated. The set of icon images analyzed can be referred to as a reference set. Then the arithmetic mean value of the absolute value of each matrix coefficient can be determined. The absolute value of a matrix coefficient can be referred to as a reference average magnitude. When processing an image, the differential value for each coefficient in its DCT matrix can be calculated by comparing the absolute value of the current coefficient in the matrix with the corresponding mean value in the reference set of images (i.e., the reference average magnitude). Differentials are encoded as 1 (one) if they are above the corresponding mean value or as 0 (zero) if they are not.

Figure 4:
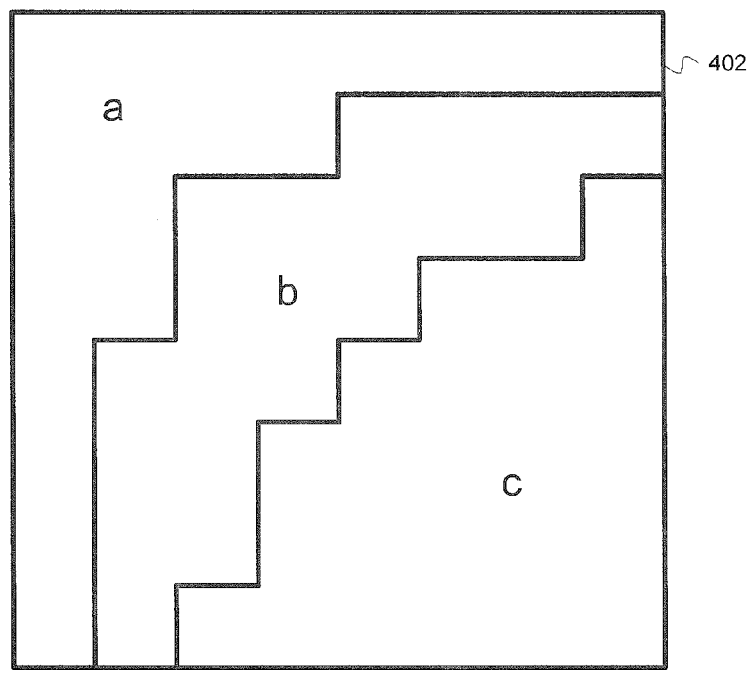
FIG. 4 illustrates areas of a DCT matrix using different weights when measuring a weighted Hamming distance.
Figure 4:
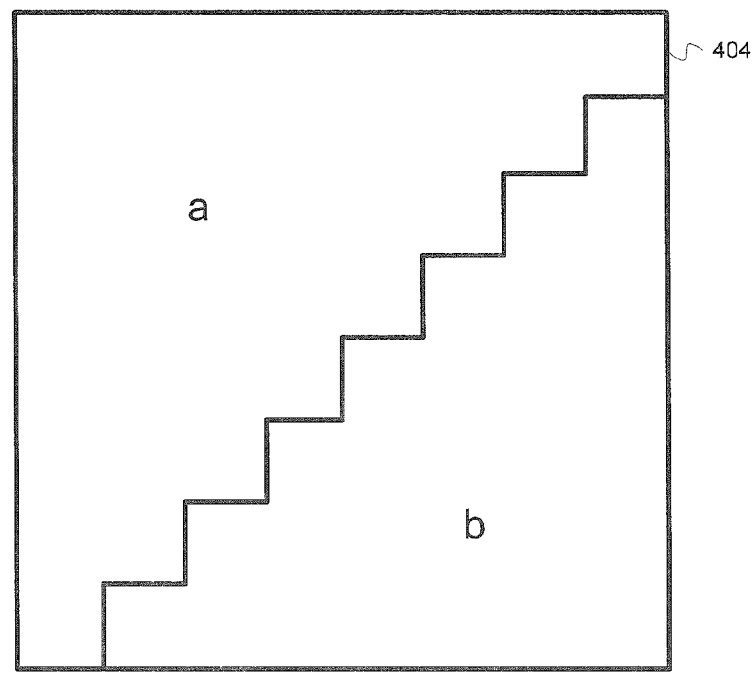

At block 212, the image hash of the icon in the installation package can be compared with hash values obtained from known images to determine if the image icon in the installation package may represent an icon that is used in malware software. In some embodiments, a weighted Hamming distance function is used to compare hashes. Because bits in hashes correspond to known parts of the DCT matrix for each of the encoded features, the Hamming difference of each individual bit can be multiplied by a multiplier belonging to the area of the matrix the coefficient represented by the bit resides in. Multipliers and area definitions also differ among the features themselves and individual features can also have their global multipliers. The multiplier-defining areas are illustrated in FIG. 4. Graph 402 of FIG. 4 represents areas of effect a-c for bit weight multipliers used in bits that encode absolute values, while graph 404 represents areas of effect a-b for bit weight multipliers used in bits that encode average neighborhood differences. The distance function operates on two hashes as follows:

Start with a distance of 0.

If the two bits at a given position have the same value, do nothing.

If the two bits differ, add 1×area multiplier×feature multiplier to the distance.

Once all bits are passed, output the total accumulated distance value.

A weighted distance function allows the algorithm to perform different similarity comparisons upon already generated hashes. The weights can be tuned to fit a particular image domain, for example, icons. Additionally, the weights can be adjusted to shift preferences to particular traits of an image in a given frequency range, effectively providing a new view on already hashed images. The set of weights may be different for each perceptual similarity determination pass, depending on the intended perceptual feature priorities—even when comparing already computed hashes. The algorithm thus provides a novel ex-post tunability.

Those of skill in the art having the benefit of the disclosure will appreciate that the operations of the engine disclosed herein can process multiple icons consecutively.

Figure 5:
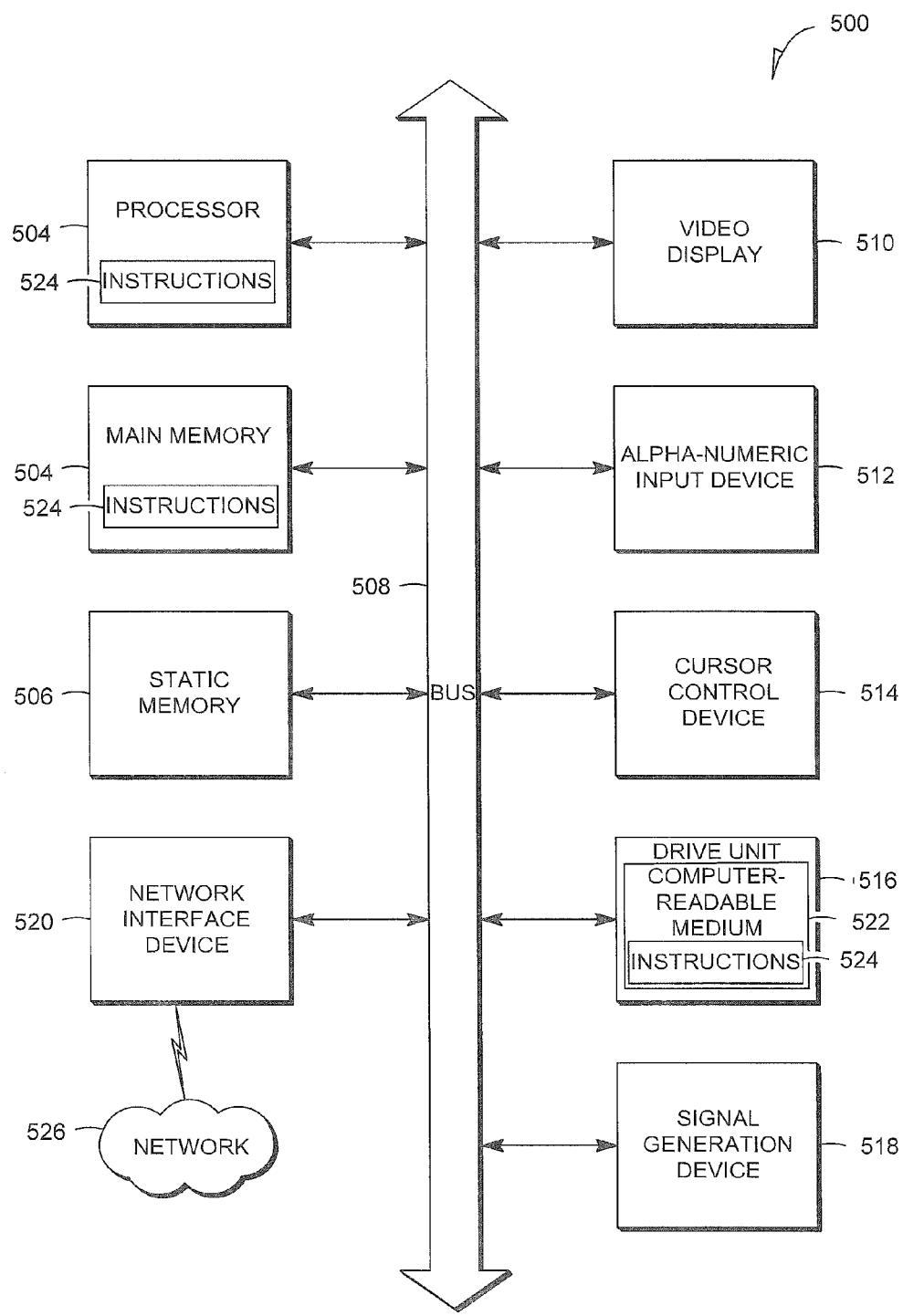
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to both servers and/or remote clients.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the team "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A method comprising:
    receiving first image data, wherein said first image data comprises a first icon;
    performing a discrete cosine transformation (DCT) on at least a portion of the first image data to create a DCT matrix;
    determining a plurality of features from coefficients of a plurality of areas of the DCT matrix, wherein the features comprise a sign of a coefficient, a magnitude of the coefficient, a neighbor variance of the coefficient, and a differential between a magnitude of the coefficient and a reference average magnitude;
    encoding the plurality of features of the coefficients into a first hash string; and determining a weighted distance between the first hash string and a second hash string associated with a second icon for use in determining whether the first icon is a suspicious icon that is potentially associated with malware.

2. The method of claim 1, wherein the neighbor variance of the coefficient is determined according to an area of the portion of the DCT matrix.

3. The method of claim 1, further comprising:
uniting a first area of the plurality of areas with a second area of the plurality of areas to create a temporary area;
wherein the magnitude of the coefficient is determined based, at least in part, on statistical valued computed from the temporary area.

4. The method of claim 1, further comprising:
determining a plurality of DCT matrices for a plurality of reference images; and
determining a mean value for each corresponding coefficient of the plurality of DCT matrices;
wherein the reference average magnitude comprises the mean value.

5. The method of claim 1, wherein the weighted distance comprises a weighted hamming distance that is weighted according to a position of a feature encoded in the first hash string and the second hash string.

6. The method of claim 1, further comprising:
composing a constant image pattern with the first image data, wherein the DCT transformation is performed on the first image data composed with the constant image pattern.

7. A non-transitory machine-readable medium having stored thereon instructions, that when executed by one or more processors of a device, cause the device to:
receive first image data, wherein said first image data comprises a first icon;
perform a discrete cosine transformation (DCT) on at least a portion of the first image data to create a DCT matrix;
determine a plurality of features from coefficients of a plurality of areas of the DCT matrix, wherein the features comprise a sign of a coefficient, a magnitude of the coefficient, a neighbor variance of the coefficient, and a differential between a magnitude of the coefficient and a reference average magnitude;
encode the plurality of features of the coefficients into a first hash string; and
determine a weighted distance between the first hash string and a second hash string associated with a second icon for use in determining whether the first icon is a suspicious icon that is potentially associated with malware.

8. The non-transitory machine-readable medium of claim 7, wherein the neighbor variance of the coefficient is determined according to an area of the portion of the DCT matrix.

9. The non-transitory machine-readable medium of claim 7, wherein the instructions further include instructions to cause the device to:
unite a first area of the plurality of areas with a second area of the plurality of areas to create a temporary area;
wherein the magnitude of the coefficient is determined based, at least in part, on statistical valued computed from the temporary area.

10. The non-transitory machine-readable medium of claim 7, wherein the instructions further include instructions to cause the device to:
determine a plurality of DCT matrices for a plurality of reference images; and
determine a mean value for each corresponding coefficient of the plurality of DCT matrices;
wherein the reference average magnitude comprises the mean value.

11. The non-transitory machine-readable medium of claim 7, wherein the weighted distance comprises a weighted hamming distance that is weighted according to a position of a feature encoded in the first hash string and the second hash string.

12. The non-transitory machine-readable medium of claim 7, wherein the instructions further include instructions to cause the device to:
compose a constant image pattern with the first image data, wherein the DCT transformation is performed on the first image data composed with the constant image pattern.

13. An apparatus comprising:
one or more processors;
a non-transitory machine-readable medium coupled to the one or more processors; and
a perceptual image hash unit executable by the one or more processors and configured to:
receive first image data, wherein said first image data comprises a first icon,
perform a discrete cosine transformation (DCT) on at least a portion of the first image data to create a DCT matrix,
determine a plurality of features from coefficients of a plurality of areas of the DCT matrix, wherein the features comprise a sign of a coefficient, a magnitude of the coefficient, a neighbor variance of the coefficient, and a differential between a magnitude of the coefficient and a reference average magnitude,
encode the plurality of features of the coefficients into a first hash string, and
a detection engine configured to determine a weighted distance between the first hash string and a second hash string associated with a second icon for use in determining whether the first icon is a suspicious icon that is potentially associated with malware.

14. The apparatus of claim 13, wherein the neighbor variance of the coefficient is determined according to an area of the portion of the DCT matrix.

15. The apparatus of claim 13, wherein the perceptual image hash unit is further configured to:
unite a first area of the plurality of areas with a second area of the plurality of areas to create a temporary area;
wherein the magnitude of the coefficient is determined based, at least in part, on statistical valued computed from the temporary area.

16. The apparatus of claim 13, wherein the non-transitory machine-readable medium includes instructions to cause the apparatus to:
determine a plurality of DCT matrices for a plurality of reference images; and
determine a mean value for each corresponding coefficient of the plurality of DCT matrices;
wherein the reference average magnitude comprises the mean value.

17. The apparatus of claim 13, wherein the weighted distance comprises a weighted hamming distance that is weighted according to a position of a feature encoded in the first hash string and the second hash string.

18. The apparatus of claim 13, wherein perceptual image hash unit is further configured to:

compose a constant image pattern with the first image data, wherein the DCT transformation is performed on the first image data composed with the constant image pattern.

19. The method of claim 1, wherein the icon comprises a first image domain and the weighted distance function utilizes adjustable weights, said method further comprising tuning the weights to fit a second image domain.

20. The method of claim 19, said method further comprising adjusting the adjustable weights to shift preferences to particular traits of an image in a given frequency range.

21. The method of claim 20, said method further comprising, based upon a priority of said features, using a plurality of sets of adjustable weights.

22. The method of claim 21, said method further comprising using a different set of said sets of adjustable weights for each of a plurality of perceptual similarity determination passes.

23. The non-transitory machine-readable medium of claim 7, wherein the icon comprises a first image domain and the weighted distance function utilizes adjustable weights, wherein the instructions further include instructions to tune the weights to fit a second image domain.

24. The non-transitory machine-readable medium of claim 23, wherein the instructions further include instructions to adjust the adjustable weights to shift preferences to particular traits of an image in a given frequency range.

25. The non-transitory machine-readable medium of claim 24, wherein the instructions further include instructions to, based upon a priority of said features, use a plurality of sets of adjustable weights.

26. The non-transitory machine-readable medium of claim 25, wherein the instructions further include instructions to use a different set of said sets of adjustable weights for each of a plurality of perceptual similarity determination passes.

27. The apparatus of claim 13, wherein the icon comprises a first image domain and the weighted distance function utilizes adjustable weights, wherein the the weights are tuned to fit a second image domain.

28. The apparatus of claim 27, wherein the adjustable weights are adjusted to shift preferences to particular traits of an image in a given frequency range.

29. The apparatus of claim 28, wherein, based upon a priority of said features, a plurality of sets of adjustable weights is used.

30. The apparatus of claim 29, wherein a different set of said sets of adjustable weights is used for each of a plurality of perceptual similarity determination passes.

* * * * *